J. WARGO, Jr.
PORTABLE CAROUSEL.
APPLICATION FILED APR. 28, 1917.
1,276,292.   Patented Aug. 20, 1918.
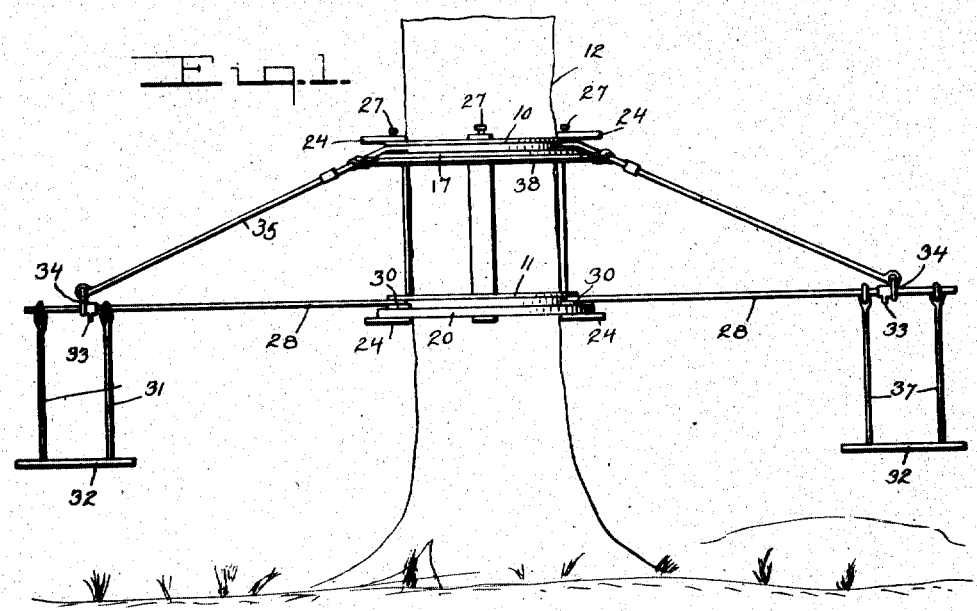
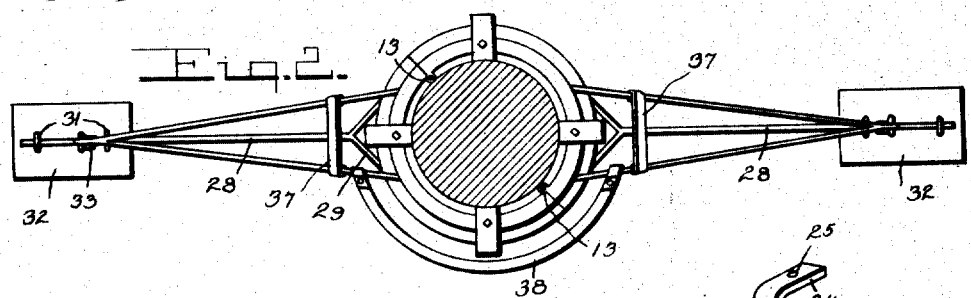
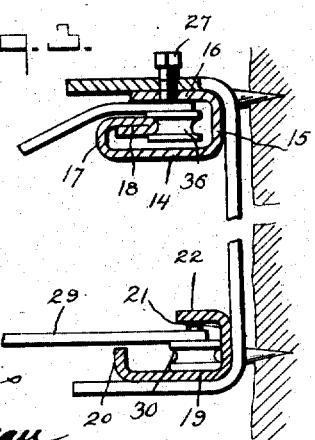
WITNESSES
R N Jones
INVENTOR
John Wargo, jr.
BY Richard Bowen
ATTORNEY

UNITED STATES PATENT OFFICE.

JOHN WARGO, JR., OF TRENTON, NEW JERSEY.

PORTABLE CAROUSEL.

1,276,292.  Specification of Letters Patent.  Patented Aug. 20, 1918.

Application filed April 28, 1917. Serial No. 165,248.

*To all whom it may concern:*

Be it known that I, JOHN WARGO, Jr., a citizen of the United States, residing at Trenton, in the county of Mercer and State of New Jersey, have invented certain new and useful Improvements in Portable Carousels, of which the following is a specification.

This invention has relation to carousels, and has for an object to provide a device of this character adapted to be supported upon the trunk of a tree, and at an elevation above the ground and embodying a plurality of swinging seats mounted to rotate around the tree.

Another object of the invention is to provide a carousel having the above named characteristics and embodying annular supports formed in separable halves whereby they may be separated and embraced about the trunk of a tree and reconnected to form supports for a plurality of swinging seats.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1, is a view in side elevation of a carousel constructed in accordance with my invention and illustrating its application to the trunk of a tree.

Fig. 2 is a view of my device in plan.

Fig. 3, is a vertical section on an enlarged scale taken through both of the supporting members of my device, and Fig. 4, is a detail view in perspective of one of the tree engaging members.

With reference to the drawings, 10 and 11 indicate generally a pair of annular members which are adapted to be embraced about the trunk of a tree indicated at 12 and disposed in vertical superposed spaced relation to form a support for a plurality of swinging seats rotatable about the annular members in a manner which will be presently noted.

The upper annular member 10 is split diametrically and the meeting end of each half is formed with apertured ears 13 which are adapted to be interengaged and connected through the medium of a bolt passed therethrough after the annular member has been embraced about the trunk of the tree. The annular member 10 may be cast, or formed of pressed metal and is substantially convolute in cross section comprising a portion 14 which is horizontally disposed when the member is embraced about a tree trunk, a vertical annular portion 15, a radial horizontal portion 16 formed at the upper end of the portion 15, a vertical annular portion 17 formed at the outer extremity of the horizontal portion 14, and an inwardly extending annular radial portion 18 formed upon the upper edge of the vertical portion 17. The flanges 18 and 16 are spaced vertically, and the inner periphery of the flange 18 may be rounded as for instance by doubling the metal upon itself.

The lower annular member 11 when embraced about a tree is formed with an annular horizontal portion 19 having a vertical annular portion 20 formed upon its outer periphery, and a vertical annular portion 21 formed upon its inner periphery, said portion 21 having a horizontal radial annular flange 22 formed upon its upper edge.

To support the annular members at the desired elevation above the ground, after they have been embraced about the tree trunk, I provide a plurality of tree engaging devices, one of which is shown in detail in Fig. 4 from which it will be noted that they comprise bars 23 having their terminals bent at right angles and in the same direction as indicated at 24, the upper bent terminal 24, when said bar is disposed vertically having a threaded aperture 25. Each bar 23 is furthermore formed upon its side face remote from the bent terminal 25 with spurs 26. These tree engaging devices, of which four are ordinarily used to support the annular members, are arranged in uniform circumferentially spaced relation about the tree trunk and their spurs 26 engaged or driven into the tree trunk. The bars 23 are all disposed vertically and arranged as set forth in Fig. 1 of the drawings. The annular members 10 and 11 are then embraced about the tree trunk and a screw 27 inserted in the opening 25 of each tree engaging device, each screw being adapted to engage a threaded opening formed in the horizontal flange 16 of the upper annular member 10. Said upper annular member may therefore be supported through the medium of these screws, and furthermore may be leveled by suitably adjusting each screw. It will be apparent that owing to the fact that each tree engaging device is formed at its lower end with a horizontal terminal 24, the lower annular member 11 may be readily supported thereupon. I next provide two or more trucks 28 which are disposed horizontally and in opposite directions at opposite sides of the tree trunk, the adjacent ends of said trucks being bifurcated as indicated at 29 and the terminals thus formed provided with anti-friction rollers 30. The struts 28 may if desired be conveniently formed of tubing. When assembling the device the struts are disposed as intimated above and the rollers 30 engaged against the outer surface of the vertical member 21 of the lower annular member 11 as set forth in Fig. 3 of the drawings. To the outer end of each strut 28 there is hingedly connected a pair of depending rods 31, spaced and connected at their lower ends with a member 32 to form a seat, the arrangement constituting a swing which is oscillatably supported upon the strut. The outer terminal of each strut 28 is furthermore provided with a collar 33 to limit the inward movement of an apertured member 34 slidably mounted upon the strut at the outer end thereof. I next locate above each strut a brace member each of which comprises a pair of rods 35, connected together at one end and secured at said end to the slidable member 34. The rods are then diverged and directed toward the upper annular member and provided upon their terminals with anti-friction rollers 36 which are inclosed within the annular member 10, said rollers engaging upon the rounded portion of the flange 18 as shown in Fig. 3 of the drawings. The rods 35 may be connected through the medium of a brace 37 to retain them in proper relation. As intimated above the struts 28 and consequently the braces disposed thereabove are extended in diametrically opposite directions relative to the tree trunk and to preserve them in such relation a semi-circular brace 38 is provided embraced about the tree and having its terminals connected to one of the rods 35 of each brace comprised by the same.

The operation of my device should be apparent from the foregoing description of the construction, as it will be apparent that the swings are designed to support the passengers and to rotate in unison in a circumscribed path about the tree trunk, such rotation being facilitated by the provision of the antifriction rollers 30 and 36 rolling upon the surfaces provided therefor by the annular members 10 and 11. It will furthermore be noted that I have provided a novel arrangement whereby a portable carousel of this type may be applied to the trunk of a tree of average diameter when disposed at any desired elevation above the ground, with means for securely fastening the supporting elements to the tree trunk.

Having thus described my invention, what I claim as new and desire to secure by Letters Patent is:—

1. In a carousel, a pair of annular members, formed in separable sections whereby they may be embraced about the trunk of a tree; means for securing said sections together; means for securing the annular members to the tree, a pair of horizontal struts having rollers upon their inner ends adapted to be guided in the lower annular member, a pair of braces having rollers adapted to be guided in the upper annular member for supporting the outer ends of the struts, and swings supported upon the struts.

2. In a carousel, a pair of annular members, formed in separable sections whereby they may be embraced about the trunk of a tree, each annular member being formed to provide an annular track, means for securing said annular members to the tree, a pair of struts disposed in diametrically opposite directions having rollers upon their adjacent ends guided for movement in the track of the lower annular member, a pair of braces having rollers upon their adjacent ends adapted to be guided in the track of the upper annular member, the remote ends of said braces being connected to the outer ends of the struts, and swings supported upon said struts.

3. In a carousel, a plurality of tree trunk engaging elements comprising bars having spurs adapted to be driven into the trunk and having their terminals bent outwardly and radially relative to the tree trunk, a pair of annular members adapted to be embraced about the trunk in vertical spaced relation, the lower member resting upon the lower terminal of each of said tree engaging elements, means for securing the upper annular member to the upper terminals of said tree engaging elements, and passenger supporting means suspended from the annular members in a manner to permit rotation of said passenger supporting means about the tree.

4. In a carousel, a plurality of annular elements to be embraced about a tree trunk in superposed relation, an annular radially and inwardly directed flange forming a track and formed upon the upper annular member, a plurality of rollers engaging the inner surface of said flange, a plurality of rollers engaging the outer surface of the lower annular member, means for securing said annular member to the tree trunk, means for connecting said annular members against relative movement, radial arms extending from the rollers of the lower annular member, braces connecting the rollers of the upper annular member to said arms, and chairs supported upon the outer ends of said arms.

In testimony whereof I affix my signature in presence of two witnesses.

JOHN WARGO, Jr.

Witnesses:
JOZEF WERNER,
ANDREW DUCH.